United States Patent Office 3,095,676
Patented July 2, 1963

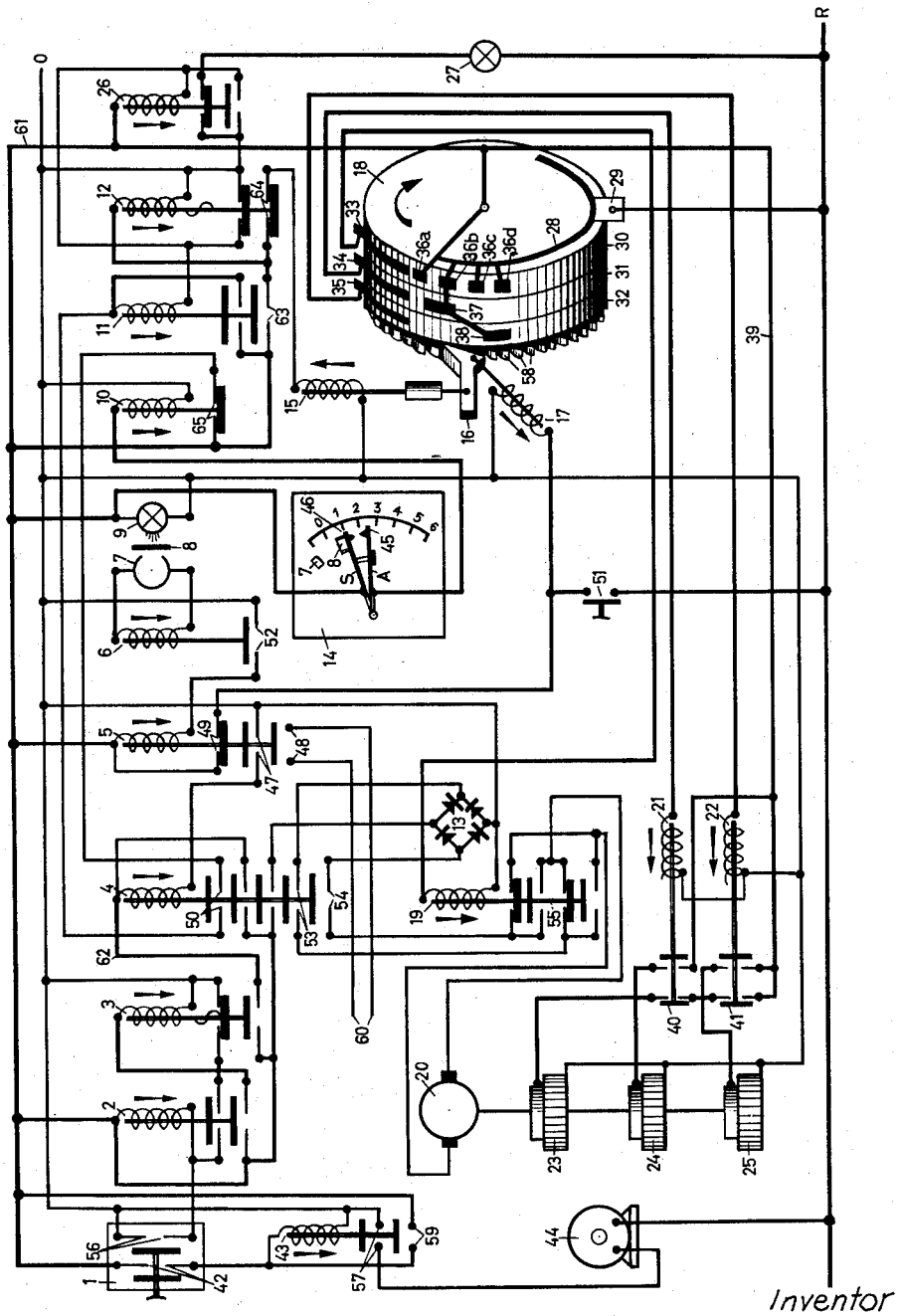

3,095,676
AUTOMATIC BALANCING ARRANGEMENT FOR GRINDING WHEELS
Rolf Völler, Dagersheim, Kreis Boblingen, Germany, assignor to Fortuna-Werke Spezialmaschinenfabrik Aktiengesellschaft, Stuttgart-Bad Cannstatt, Germany
Filed Mar. 22, 1962, Ser. No. 181,640
Claims priority, application Germany Mar. 25, 1961
11 Claims. (Cl. 51—169)

The present invention relates to an arrangement for automatically balancing grinding wheels on grinding machines which are provided with an oscillation imbalance indicator, more particularly, to such a balancing arrangement which automatically carries out in a predetermined sequence a series of balancing operations on the grinding wheel with the arrangement being shut off upon completion of these balancing operations and a warning lamp illuminated in the event the grinding wheel is still unbalanced after completion of the balancing steps.

The conventional balancing arrangement for grinding wheels on grinding machines comprises three adjusting mechanisms for positioning a plurality of balance weights or counterweights to counteract imbalances in the grinding wheels. The first adjusting mechanism positions the counterweight radially to ascertain the radial direction from the axis of rotation of the grinding wheel wherein the imbalance is best counteracted. The second adjusting mechanism varies the quantity of the balancing weight and the third adjusting mechanism axially displaces the balancing weight with respect to and parallel to the axis of rotation of the grinding wheel.

These adjustments are carried out by manually positioning the balancing weights according to the observation of the indicator pointer of an oscillation imbalance indicator wherein the indicating needle is strongly damped. Any imbalances in the grinding wheel or its balancing weights are thus indicated by this pointer. When the direction, quantity or axial position of the balance is changed in any way, then the imbalance either increases or decreases and the value indicated by the pointer varies accordingly. This indication by the pointer is used by the operator to determine if he is progressively reducing the imbalance in the grinding wheel.

At the beginning of the balancing operation the imbalance in the grinding wheel can be represented by a vector originating from the axis of rotation of the grinding wheel. This imbalance will produce a certain deviation in the indicator pointer of the oscillation imbalance indicator.

In the actual balancing operation the operator endeavors to position a counterweight opposite the imbalance vector so as to counteract. When this position is achieved, a first minimum of the total imbalance is then indicated by the pointer. The operator then varies the quantity of the counterweights, either increasing them or decreasing them, until the oscillation indicator pointer decreases again to a second minimum value. The imbalance can then be further reduced by displacing the counterweight in an axial direction with respect to the axis of rotation of the grinding wheel to obtain a third minimum reading of the pointer which, in most cases, will indicate a complete balancing of the grinding wheel.

The sense in which each of the above adjustments can be carried out is determined only by trial and error by simultaneously observing the pointer of the oscillation indicator. Where the indicator pointer indicates increasing imbalance, the sense of the adjustment is incorrect and where the pointer indicates decreasing imbalance, the sense of the adjustment is correct. As a result, this manual balancing operation not only requires a certain degree of skill and experience on the part of the operator, but also a certain period of time. As a result, this balancing of the grinding wheel was omitted in many cases in which a balanced grinding wheel would have been desirable.

It is therefore the principal object of the present invention to provide a novel and improved balancing arrangement for grinding wheels on grinding machines.

It is a further object of the present invention to provide a balancing arrangement which automatically carries out the balancing steps as described above.

It is another object of the present invention to automatically carry out the complete balancing operation as soon as an impulse is transmitted by means of a control switch to the balancing arrangement either manually at the beginning of the grinding operation or automatically during the performance of a grinding operation.

The control arrangement of the present invention essentially comprises a control circuit comprising a plurality of relays, contactors, and a step switch mechanism for drivingly connecting a plurality of adjusting drives in a predetermined sequence in order to automatically carry out the adjusting operations as described above with respect to a grinding wheel.

The several components of the control circuit can be divided into three groups as follows:

(1) The three adjusting mechanisms for each adjusting operation together with a drive for each adjusting mechanism.

Auxiliary relays and switches for switching the required drive together with a rectifier including a reversible contactor for supplying the drive of the adjusting mechanisms with electric current.

A servomotor which can be selectively coupled to each of the adjusting mechanisms by clutches.

(2) A step switch mechanism including a return spring, a ratchet and pawl mechanism for advancing the switch mechanism, and a lock pawl for locking the mechanism in position.

The step switch mechanism controls three circuits as follows:

(a) a control circuit for the reversible contactor to control the direction of rotation of the servomotor;
(b) a circuit to actuate the auxiliary relay with the switch for actuating the clutch for adjusting the quantity of the counterbalance weights;
(c) a circuit for actuating the auxiliary relay with the switch for actuating the clutch for the axial displacement of the counterweights.

(3) An oscillation imbalance indicator having an indicating pointer and a trailing pointer together with a source of light impinging upon a photoelectric cell connected with an auxiliary relay and an auxiliary contactor.

In addition to the above three groups of components there is a control switch for energizing the balance arrangement and for energizing the control circuit for the clutch drivingly connecting the adjusting mechanism for positioning the counterweights in a suitable direction from the center of the grinding wheel.

In the operation of the balancing arrangement a control switch is initially closed to connect the drive of the grinding wheel to be balanced to a source of electrical energy. After a delay of about 1 minute, during which the grinding wheel attains its full speed and during which the oscillation indicator indicates a value corresponding to the total imbalance of the grinding wheel and balancing weights, a main contactor comprising five circuits is closed and remains closed until the complete balance operation is terminated.

The first circuit is a holding circuit to maintain the main contactor closed.

The second circuit supplies the rectifier with alternating current for supplying current to the servomotor.

The third circuit is a holding circuit for an auxiliary contactor.

The fourth and fifth circuits supply the direct current from the rectifier to the servomotor and the reversing contactor.

Upon the closing of the main contactor the balancing operation begins by the displacement of the direction vector of the counterweights in order to counterbalance the imbalance in the grinding wheel. The servomotor is supplied with electric current to rotate in one or the other direction of rotation. The servomotor is then coupled with the adjusting drive for locating the direction of counterbalance through a magnetic clutch. Should the indicated value on the oscillation indicator increase, it is then apparent that the moving of the counterbalance vector occurred in the wrong direction. The trailing pointer of the oscillation indicator will become disengaged from the indicating pointer as the indicated value increases to open a control circuit. This circuit changes the direction of rotation of the servomotor and accordingly the sense of the variation of the counterbalance vector. Simultaneously, the step switch mechanism is switched by one switching step.

By moving the counterbalance vector in the opposite direction because of this reverse direction of rotation of the servomotor, the indicated value on the oscillation indicator will decrease and the indicating pointer will push the trailing pointer in the direction of decreasing imbalance.

The continued moving of the counterbalance vector in this sense will cause a continuously decreasing indicated value in the oscillation indicator until an optimum value which is a minimum indicated value is exceeded. However, as soon as the indicated value again increases, which is for the second time, the trailing pointer again opens and the step switch mechanism is switched a second time by one step wherein the adjusting mechanism for the quantity of the counterweight is now switched into circuit.

The motor then drives the adjusting mechanism for the quantity of counterbalance in one sense, either increasing or decreasing the quantity of the balance weight.

Should the indicated value on the oscillation indicator first increase to indicate that the quantity of counterweight is occurring in the wrong sense, the trailing pointer will become disengaged from the indicating pointer whereby the step switch mechanism will be immediately switched forward by one switching step and the sense of rotation of varying the counterweight will be reversed. This will cause the indicated value to decrease.

When the indicated value attains a second minimum value, the indicated value will then increase. This will again immediately switch the stepping mechanism a further step forward to reverse the sense of rotation of the adjusting motor, the variation of the quantity of counterbalance will be interrupted and switched off, and the circuit will be changed to the third adjusting mechanism for axially positioning the counterbalances with respect to the axis of the grinding wheel or, in effect, to axially position the counterbalance vector.

The operations of the balancing arrangement can be summarized in the following manner: When the indicated value on the oscillation imbalance indicator decreases in the beginning of the balancing operation with the determination of the proper radial direction of the counterbalance, the operator is informed that the movement of the adjusting mechanism for radially positioning the counterbalance vector is in the correct sense. When a minimum imbalance reading is obtained, the indicated value will again increase so that the trailing pointer will become disengaged for the first time from the indicating pointer. This disengagement of the pointers will actuate circuits to switch the step switch mechanism one step simultaneously with a reversal of the sense of direction of radially positioning the counterbalance vector. When the minimum indicated value has been exceeded a second time, the step switch mechanism will be switched a second time by one switching step whereby the variation of the radial direction of the counterbalance vector will be stopped and the circuit will be switched over to varying the quantity of the balance weights.

Should the indicated value decrease immediately when the quantity of the counterbalance is changed, then the additional switching step of the step switching mechanism will occur in the same sense as described. Consequently, if the indicated value immediately decreases when the variation in the quantity of the counterbalance is initiated, then only one change in the adjustment direction occurs after the first exceeding of the minimum indicated value. After exceeding the minimum indicated value for the second time, a reversal in the sense of the adjustment of the counterweight occurs simultaneously with a transition to the axial displacement of the counterbalance vector. The transition to varying the axial position of the counterbalance vector always occurs in the last instance.

If the balancing arrangement has sufficient compensating capacity to completely balance the grinding wheel, this complete balance will occur either prior to or during the last step of the balancing operation, i.e. the axial displacement of the counterbalance vector. As soon as the deflection of the indicator pointer is 0 or attains a predetermined minimum indicated value of imbalance, the trailing pointer has a shutter thereon which interrupts a beam of light to a photoelectric cell. The interruption of this beam of light terminates the balancing operation and the motor for the grinding wheel spindle remains energized and continues to operate. The grinding operation can then be started.

If, however, it is not possible to obtain a complete balance of the grinding wheel during the last step of the balancing operation, then not only does the balancing arrangement become deenergized after the last switching step of the step switch mechanism, but the current supplied to the motor for the grinding spindle is interrupted. In addition, a warning signal is energized, such as a red signal lamp, to indicate that complete balance of the grinding wheel has not been achieved. In this event a rough balancing of the grinding wheel must be performed prior to carrying out the balancing operation by the balancing arrangement of the present invention. This rough balancing may consist of manually positioning balancing weights in the balancing nuts of the grinding wheel flange.

The details of the balancing arrangement of the present invention and the operation thereof will be subsequently described.

Further objects and advantages of the present invention will be apparent upon reference to the accompanying description when taken in conjunction with the following drawing which comprises an electrical circuit diagram to schematically show the connections between the several components of the balancing arrangement.

In this drawing, all of the relays and contactors are illustrated in their deenergized positions and the step switch mechanism rotates in the direction of the arrow when its actuating electromagnetic coil is operated.

With reference to the drawing, there is a push button control switch 1 which actuates a switch 42 connected to a grinding wheel spindle contactor relay 43, and a second switch 56 for initiating the automatic operation of the balancing arrangement.

The grinding spindle relay 43 comprises a first pair of contacts 57 for connecting the grinding spindle motor to a source of electric current and a second pair of contacts 59 to form a holding circuit for the grinding spindle contact 43 in the event the switch 42 is opened after the control switch 1 has been actuated.

Upon actuation of the control switch 1 the contacts 56 energize a parallel connected time element comprising a relay 2 and a first time relay 3. The time relay 3 has a cycle of about 1 minute within which the grinding wheel attains its operating speed. Both of the relays 2 and 3 form holding circuits for each other.

After the cycle of the time relay 3 has expired, the relay closes a contact which connects electric lead 62 with a source of electrical energy. The lead 62 leads to one end of the coil of a main contactor 4. The relay 3 also simultaneously interrupts the electrical connection to the coil of the relay 2 whereby the coil of the time delay relay is again deenergized.

There is an oscillation imbalance indicator 14 having an indicator pointer 45 which pushes a trailing pointer 46 in the direction of decreasing imbalance indication.

Built into the oscillation indicator is a photoelectric cell 7 which is energized by a beam of light emanating from a light source 9. The current generated by the photoelectric cell 7 controls an auxiliary relay 6 which actuates contacts 52 to control an auxiliary contactor 5. The contactor 5 in turn actuates switch contacts 47 to connect the other side of the coil of the relay 4 to a source of electrical energy to maintain the main contactor 4 energized as soon as it has been connected to a current source by the actuation of the time relay 3. The auxiliary contactor 5 also actuates switch contacts 48 to which are connected line 60 running to a control device for locking the feed of the grinding wheel bed during the balancing operation. In addition, when the coil of the auxiliary contactor 5 is deenergized, the contacts 49 are closed to supply electric current to an electromagnet 17 to withdraw a feed pawl 16 and a lock pawl not illustrated in the drawing from pawl notches 58 of a step switch mechanism 18. The step switch mechanism is provided with a return spring not illustrated in the drawing for returning the switch mechanism to its initial position upon withdrawal of the lock pawl.

Once the main contactor 4 is energized, it remains energized during the duration of the entire balancing operation. The main contactor 4 also will remain energized if the contactor 2 and the first time relay 3 are released shortly after the energization of the first time relay 3.

Energization of the main contactor 4 closes contacts to actuate the following circuits.

(1) A rectifier 13 connected to a servomotor 20 is connected to a supply of alternating current.

(2) Two contact switches 53 and 54 are closed to close the direct current circuit for the servomotor 20 from the rectifier 13 through a reversing contactor 55.

(3) Contact switch 50 is closed to provide a holding circuit for an auxiliary relay 11 which, in turn, controls the circuit for stepping the step switch mechanism 18.

(4) Closing a holding circuit for the coil of the main contactor 4 so that one side of this coil is connected through contacts 47 of the auxiliary contactor 5 to one side of a source of electrical energy.

The servomotor 20 can be selectively connected to clutches 23, 24 and 25 which are the clutches for the adjusting mechanisms for the balancing operation. While this embodiment shows a single servomotor connectable to the three clutches, the balancing arrangement can be provided with a separate servomotor for each adjusting mechanism.

The clutch 23 for the adjusting mechanism for varying radially the counterbalance vector is connected with the servomotor 20, provided that no electrical pulses are transmitted during the balancing operation from the step switch mechanism 18 to auxiliary relays 21 and 22. These pulses act on the one hand to disconnect the clutch 23 from servomotor 20, and on the other hand to connect either the clutch 24 for the adjusting mechanism for varying the quantity of the counterweight or the clutch 25 for the adjusting mechanism for the axial displacement of the counterbalance vector to the servomotor 20.

Clutches 23, 24, 25 may govern adjusting elements 41, 29 and 21 of copending application Ser. No. 61,873 filed October 11, 1960 and corresponding French Patent 1,268,852.

As mentioned previously, each change in the direction and quantity of the balancing weights produces a variation in the indicated reading of the oscillation indicator 14. Both the indicator pointer 45 and the trailing pointer 46 are provided with electrical contacts connected in a circuit for the coil of relay 10. Separation of the indicator pointer from the trailer pointer will interrupt this circuit to deenergize the auxiliary relay 10. Accordingly, contact switch 65 is closed and electric current flows in a circuit connecting contacts 50 of the main contactor 4 and the auxiliary relay 11. Energization of the auxiliary contactor 11 closes a switch in a circuit connecting a second time relay 12 with the magnetic coil 15 to actuate the feed pawl 16.

As the indicated value on the oscillation indicator decreases, the pointer 45 pushes the trailing pointer 46 in the direction of decreasing indication of imbalance whereby the contacts on these pointers come into contact with each other and close the circuit connecting the auxiliary relay 10. The contacts 65 are thus interrupted and auxiliary relay 11 is again deenergized. Thus, the oscillating motion of indicator pointer 45 is used for controlling the circuit effecting the step switching of the step switching mechanism 18.

Since the electric pulse transmitted to the coil of the auxiliary relay 11 by the relative movement between the indicator pointer 45 and the trailing pointer 46 is short and generally too short to properly energize the coil 15 to actuate the step pawl 16, the auxiliary relay 11 is held by the second time relay 12 a sufficient period of time to ensure that the magnetic coil 15 is energized a proper length of time to step the step switch mechanism 18 through the additional step. The time relay 12 can be adjusted for times ranging from 0 to 4 seconds.

When the second time relay 12 is actuated, the coil 15 as well as the auxiliary relay 11 are again deenergized. Thus, the time relay 12 prevents disturbing double switches when the pointers are vigorously oscillating or in the event there is a prolonged interruption of current in the contacts of the pointers.

The step switch mechanism 18 comprises a circular segment of a contact bar 28 which is engageable by a sliding contact 29 connected to electric line R which leads to one side of a source of electrical energy.

Extending from the contact bar 28 is a line 39 connected to switch contacts 40 and 41 which are controlled by auxiliary relays 21 and 22. Also extending from the contact bar 28 is an electric lead 61 to the control switch 1 and directly or indirectly to the several relays and contactors as well as to the source of light 9 and the oscillation indicator 14.

The step switch mechanism drum is provided with three annular contact paths 30, 31 and 32 having a plurality of contact surfaces thereon. Contact surfaces 36a, 36b, 36c, and 36d are located on contact path 30 and are engageable by a sliding contact 33. Contact surface 37 is on contact path 31 and is engageable by sliding contact 34. Contact surface 38 is on contact path 32 and is engageable by sliding contact 35.

In the idle position all three sliding contacts 33, 34 and 35 rest on insulating portions of the contact paths 30, 31 and 32, respectively. The sliding contact 33 rests on insulating portions of the contact path prior to the first, third, fifth and seventh switching steps of the step switching mechanism. After the first, third, fifth and seventh switch steps, the sliding contact 33 engages one of the contact surfaces 36a, 36b, 36c, 36d which, in turn, are connected with the contact bar 28. Depending on whether the sliding contact 33 engages an insulating portion or a contact surface, the coil 19 of reversing contactor relay 55 is deenergized or energized, respectively. Thus, the reversing contactor 55 is in one or the other switching position and the servomotor 20 rotates in either one or the other direction of rotation.

After the second and third switching steps, the sliding contact 34 rests on the contact surface 37 which is connected to the contact bar 28 and prior to the second and after the fourth switching steps rests upon an insulating portion. When sliding contact 34 rests on the contact surface 37, the auxiliary relay 21 is energized and the switch 40 disconnects the clutch 23 (for the variation radially of the direction of the counterbalance vector) from servomotor 20 and connects the clutch 24 to the servomotor 20 for varying the quantity of the counterbalance weight.

Since in the present embodiment the balancing masses or counterbalancing weights comprise the adjustment of two double eccentric members, it is appropriate to repeat the adjustment of the radial direction of the counterbalance vector. Accordingly, the switching after the fourth and fifth switching steps is the same as that prior to and after the first switching step. After this repetition, i.e. after the sixth and seventh switching steps of the step switching mechanism 18, the sliding contact 35 engages contact surface 38 which is connected with contact bar 28. As a result, the circuit connecting clutch 23 of the third adjusting mechanism is also interrupted by the switch 41 actuated by relay 22 whereas the circuit for the clutch 25 of the third adjustment mechanism for an axial displacement of the balancing weight is closed. In the event the sliding contact 34 and the sliding contact 35 are resting on insulating portions the adjusting mechanism for varying radially the direction of the counterbalance vector is then connected with the servomotor 20 by clutch 23.

After the seventh switching step, the balancing operation is automatically completed if it is at all possible to balance the grinding wheel with the compensating capacity of the balancing circuit.

The shutter 8 on the trailing pointer 46 is positioned to cover a photoelectric cell 7 to interrupt the beam of light thereon from light source 9 in the event a 0 or a predetermined small deflection of indicator pointer is obtained. When this interruption of the beam of light by the shutter 8 occurs during the balancing operation or after the seventh switching step, the auxiliary relay 6 is deenergized and the contact switch 52 opened thereby. The auxiliary relay 5 is similarly deenergized and interrupts the holding circuit for the main contactor 4. The main contactor 4 becomes deenergrfiized and the balancing operation is terminated.

In the event there remains a small imbalance after the seventh switching step, the eighth switching step occurs when all of the three sliding contacts 33, 34 and 35 rest upon insulating portions of their respective contact paths. However, since the sliding contact 29 will also become disengaged from the contact bar 28, the entire balancing arrangement will be deenergized and the motor 44 for the grinding wheel spindle will be shut off. At the same time relay 26 will close a circuit to energize signal lamp 27 the illumination of which will indicate that the grinding wheel has not been balanced and that the imbalance in the grinding wheel was too great for the compensating capacity of this balancing arrangement.

It is then necessary to roughly balance the grinding wheel in the conventional manner by positioning balance weights in balancing grooves. In order to return the step switch mechanism 18 to its initial position after the grinding wheel has not been completely balanced a switch 51 is momentarily depressed to close a circuit which energizes magnetic coil 17. Energization of this coil withdraws a locking pawl from the ratchet teeth 58 and the step switch mechanism 18 returns to its original position under the action of a return spring.

In order to start the operation of the grinding machine after a rough prebalancing or for a new grinding operation, the control switch 1 is pushed and the entire operation of the balancing arrangement is carried out in the manner as described in detail above.

In the beginning of the balancing operation the adjusting mechanism for adjusting radially the direction of the counterbalance vector is always connected. As the balancing operation progresses the adjusting mechanism for adjusting the quantity of the counterbalance and then the adjusting mechanism for axially positioning the counterbalance vector are successively connected by means of the relays and switches controlled by the stepping mechanism as described above.

It is also to be borne in mind that at the initiation of the balancing operaiton the photo-electric cell 7 is illuminated by the light source 9 and accordingly a current is passed through the coil of the relay 6 to close the switch contact 52, which in turn energizes the coil of the relay 5. As a result, the stepping magnet actuated by the coil 15 for advancing the step switch mechanism 18 is connected to a source of electrical energy in order to actuate the step switch mechanism to carry out the balancing operation. In addition, the return side of the coil of the main contactor 4 is closed by energization of the auxiliary relay 5 and a circuit is closed which prevents feeding of the bed upon which the grinding wheel is mounted. The auxiliary contactor 5 remains energized during the balancing operation and is deenergized only upon completion of the balancing operation when the shutter 8 on the trailing pointer 46 interrupts the beam of light falling upon the photoelectric cell 7.

The balancing arrangement as described above may be modified in order to repeat the balancing step of varying the weight of the counterbalance for a mass. This can be accomplished by providing a further contact surface upon contact path 31 of the step switch mechanism 18 and carrying out two further switching steps of the step switch mechanism.

The photoelectric cell control can be replaced by a similar control member such as a suitable electronic relay. The step switch mechanism 18 with its pawl control can be replaced by an electronic stepping mechanism. Further, individual drives can be provided for the three adjustment mechanisms and their respective magnetic clutches. In this event the switching arrangement would be suitably changed.

If preferred, a diode circuit and transistors can be used instead of the circuit comprising the rectifier and at least a portion of the contactor switches described above.

Thus it can be seen that the present invention provides an automatic arrangement for balancing of a grinding wheel at the beginning of a grinding operation. All of the balancing steps conventionally employed in balancing a rotating mass are carried out in the correct sequence and correct sense by a step switching mechanism actuated by the reading of an oscillation imbalance indicator. Since the balancing of the grinding wheel is carried out automatically, it is not necessary to employ trained personnel experienced in the art of balancing rotating masses. The use of this balancing arrangement will greatly increase the productive time of grinding machines since valuable time is not consumed in the balancing of the grinding wheels.

It will be understood that this invention is susceptible to modification in order to adapt it to different usages and conditions and, accordingly, it is desired to comprehend such modifications within this invention as may fall within the scope of the appended claims.

What is claimed as this invention is:

1. In an arrangement for the static and dynamic balancing of grinding wheels on grinding machines, the combination comprising an oscillation imbalance indicator having a damped indicator pointer and a trailing pointer pushed by said indicator pointer in the direction of decreasing imbalance indication, there being engageable electrical contacts on said pointers, a first adjusting drive for adjusting the radial direction of counterweights with respect to a grinding wheel, a second adjusting drive for adjusting the quantity of the counterweights, a third adjusting drive for axially displacing the counterweights with respect to the axis of a grinding wheel, a reversible servomotor drivingly engageable with said adjusting drives, a control circuit for drivingly connecting said first adjusting drive to said servomotor, a second control circuit including a step switch mechanism for reversing the direction of rotation of said servomotor and for successively connecting said second and third adjusting drives to said servomotor, a third control circuit connected to said pointer contacts for actuating said step switch mechanism upon separation of said pointer contacts, and means actuated by a predetermined minimum position of said trailing pointer for terminating the balancing operation.

2. An arrangement for the static and dynamic balancing of grinding wheels as claimed in claim 1 wherein said step switch mechanism includes an electromagnetic pawl for advancing said step switch in steps, said third control circuit being connected to said electromagnetic pawl whereby opening of said third control circuit energizes said electromagnetic pawl and closing of the third control circuit deenergizes said electromagnetic pawl.

3. An arrangement for the static and dynamic balancing of grinding wheels as claimed in claim 2 and further comprising a time delay relay in said third control circuit and actuated after 0 to 4 seconds delay to interrupt said third control circuit to deenergize said electromagnetic pawl.

4. An arrangement for the static and dynamic balancing of grinding wheels as claimed in claim 1 wherein said step switch mechanism comprises a plurality of contact surfaces positioned in three annular paths, three sliding contacts engageable with said three paths of contact surfaces respectively, a contact bar on said step switch mechanism and electrically connected to said plurality of contact surfaces, and a sliding contact engaging said contact bar and connected to one side of a source of electrical energy.

5. An arrangement for the static and dynamic balancing of grinding wheels as claimed in claim 4 and further comprising a pair of auxiliary relays having switch contacts connected respectively to the sliding contacts of said second and third paths of contact surfaces on said step switch mechanism, said switch contacts being connected to said means for drivingly engaging said servomotor with said adjusting drives whereby each adjusting drive is successively connected to said servomotor after each second step of said step switch mechanism.

6. An arrangement for the static and dynamic balancing of grinding wheels as claimed in claim 1 wherein said step switch mechanism includes an electromagnetic pawl for advancing said step switch in steps, said third control circuit being connected to said electromagnetic pawl whereby opening of said third control circuit energizes said electromagnetic pawl and closing of the third control circuit deenergizes said electromagnetic pawl, a plurality of contact surfaces positioned in three annular paths, three sliding contacts engageable with said three paths of contact surfaces respectively, a contact bar on said step switch mechanism and electrically connected to said plurality of contact surfaces, a sliding contact engaging said contact bar and connected to one side of a source of electrical energy, and a relay coil and a reversing contact for said servomotor being connected to said contact surfaces in said first path on the step switch mechanism so that said servomotor is reversed during each actuation of said step switch mechanism.

7. An arrangement for the static and dynamic balancing of grinding wheels as claimed in claim 1 and further comprising a motor driving the spindle of a grinding wheel, a control switch for energizing said balancing arrangement and connecting said spindle motor to a source of electrical energy when closed, a holding relay across said control switch to hold said motor in circuit, and means for deenergizing said holding relay when the grinding wheel is not balanced to stop said grinding wheel motor.

8. An arrangement for the static and dynamic balancing of grinding wheels as claimed in claim 1 wherein said step switch mechanism comprises a plurality of contact surfaces positioned in three annular paths, three sliding contacts engageable with said three paths of contact surfaces respectively, a contact bar on said step switch mechanism and electrically connected to said plurality of contact surfaces, a sliding contact engaging said contact bar and connected to one side of a source of electrical energy, a motor driving the spindle of a grinding wheel, a control switch for energizing said balancing arrangement and connecting said spindle motor to a source of electrical energy when closed, a holding relay across said control switch to hold said motor in circuit, means for deenergizing said holding relay when the grinding wheel is not balanced to stop said grinding wheel motor, means for moving the step switch mechanism through an additional switching step if the grinding wheel remains unbalanced upon termination of the balancing operation, said contact bar being disengaged from said sliding contact during said additional switching step so that said grinding motor is stopped and the balancing operation terminated, and a single lamp energized when said step switch mechanism is switched said additional switching step.

9. In an arrangement for the static and dynamic balancing of grinding wheels on grinding machines, and comprising a photoelectric cell and a source of light directed upon said photoelectric cell for energizing the same, an oscillation imbalance indicator having a damped indicator pointer and a trailing pointer pushed by said indicator pointer in the direction of decreasing imbalance indication, there being a shutter on said trailing pointer and interrupting the light source onto said photoelectric cell when said trailing pointer is in a predetermined minimum position, there being engageable electric contacts on said pointers, a first adjusting drive for adjusting the radial direction of counterweights with respect to a grinding wheel, a second adjusting drive for adjusting the quantity of the counterweights, a third adjusting drive for axially displacing the counterweights with respect to the axis of a grinding wheel, a reversible servomotor drivingly engageable with said adjusting drives, a control circuit for drivingly connecting said first adjusting drive to said servomotor, a second control circuit including a step switch mechanism for reversing the direction of rotation of said servomotor and for successively connecting said second and third adjusting drives to said servomotor, said step switch mechanism having a spring urging the mechanism to its initial position and a locking pawl to lock the step switch mechanism in position after each step thereof, a third control circuit connected to said pointer contacts for actuating said step switch mechanism upon separation of said pointer contacts, a circuit actuated by said interruption of light to said photoelectric cell to terminate the balancing operation, a relay in said balancing operation terminating circuit and having an open contact when said relay is energized, and a coil for actuating said locking pawl and connected to said open contact so that deenergization of said relay upon completion of the balancing operation releases said locking pawl from said step switch and said step switch mechanism returns to its original position under the action of said spring.

10. An arrangement for the static and dynamic balancing of grinding wheels as claimed in claim 9 wherein said relay has a second set of contacts which are open when said relay is deenergized, and means connected to said second set of contacts for stopping the feed of the grinding wheel during the balancing operation.

11. In an arrangement for the static and dynamic balancing of grinding wheels on grinding machines, and comprising a photoelectric cell and a source of light directed upon said photoelectric cell for energizing the same, an oscillation imbalance indicator having a damped indicator pointer and a trailing pointer pushed by said indicator pointer in the direction of decreasing imbalance indication, there being a shutter on said trailing pointer and interrupting the light source onto said photoelectric cell when said trailing pointer is in a predetermined minimum position, there being engageable electric contacts on said pointers, a first adjusting drive for adjusting the radial direction of counterweights with respect to a grinding wheel, a second adjusting drive for adjusting the quantity of the counterweights, a third adjusting drive for axially displacing the counterweights with respect to the axis of a grinding wheel, a reversible servomotor drivingly engageable with said adjusting drives, a control circuit for drivingly connecting said first adjusting drive to said servomotor, a second control circuit including a step switch mechanism for reversing the direction of rotation of said servomotor and for successively connecting said second and third adjusting drives to said servomotor, a third control circuit connected to said pointer contacts for actuating said step switch mechanism upon separation of said pointer contacts, and a circuit actuated by said interruption of light to said photoelectric cell to terminate the balancing operation.

References Cited in the file of this patent
UNITED STATES PATENTS

| | | |
|---|---|---|
| 2,142,021 | Ernst et al. | Dec. 27, 1938 |
| 2,241,637 | Ernst et al. | May 13, 1941 |
| 2,737,813 | Allen | Mar. 13, 1956 |
| 2,882,745 | Comstock | Apr. 21, 1959 |
| 2,915,918 | Comstock | Dec. 8, 1959 |